United States Patent [19]
Brandt et al.

[11] Patent Number: 5,078,167
[45] Date of Patent: Jan. 7, 1992

[54] FUEL FILTER AND PRESSURE REGULATOR SYSTEM APPARATUS

[75] Inventors: Timothy B. Brandt; Erwin W. Parr, both of Des Moines, Iowa

[73] Assignee: Parr Manufacturing, Inc., Des Moines, Iowa

[21] Appl. No.: 629,399

[22] Filed: Dec. 18, 1990

[51] Int. Cl.⁵ .............................................. G05D 5/00
[52] U.S. Cl. .................................... 137/549; 137/115; 137/510
[58] Field of Search ................ 123/467, 514; 137/115, 137/510, 549, 565

[56] References Cited

U.S. PATENT DOCUMENTS

| | | | |
|---|---|---|---|
| 1,368,475 | 2/1921 | Blakely | 123/514 |
| 3,416,506 | 12/1968 | Steiger | 123/139 |
| 3,789,819 | 2/1974 | Moulds | 123/140 MP |
| 4,310,142 | 1/1982 | Ludwig | 137/549 |
| 4,326,767 | 5/1982 | Fehrenbach et al. | 137/510 |
| 4,426,977 | 1/1984 | Taplin et al. | 123/467 |
| 4,543,938 | 10/1985 | Szlaga | 123/514 |
| 4,570,604 | 2/1986 | Thorton et al. | 123/514 |
| 4,596,219 | 6/1986 | Kemmner | 123/467 |
| 4,608,957 | 9/1986 | Kemmner | 123/467 |
| 4,616,672 | 10/1986 | Schmidt | 137/115 |
| 4,617,116 | 10/1986 | Seiler | 123/514 |
| 4,633,901 | 1/1987 | Brandt et al. | 137/510 |
| 4,664,142 | 5/1987 | Bertsch et al. | 137/510 |
| 4,756,289 | 7/1988 | Rock et al. | 123/467 |
| 4,805,575 | 2/1989 | de Concini et al. | 123/467 |

Primary Examiner—Michael Chambers
Attorney, Agent, or Firm—Henderson & Sturn

[57] ABSTRACT

A combination fuel pressure regulator and fuel filter apparatus for vehicle fuel systems has a fuel supply tank with a fuel pump therein for puming fuel to a fuel supply rail having fuel injectors attached thereto. A fuel filter is operably disposed between an inlet supply tube and a fluid outlet tube for filtering impurities from fuel passing therethrough. A valve in fluid communication with the inlet supply tube is provided with a regulator for causing flow to be short circuited back into the fuel supply tank when the pressure in the fluid outlet exceeds a predetermined level. The valve is biased to a closed position and will remain closed as long as the pressure on the clean side of the filter is below the predetermined pressure whereby all of the fuel in the inlet supply tube will pass through the filter.

24 Claims, 4 Drawing Sheets

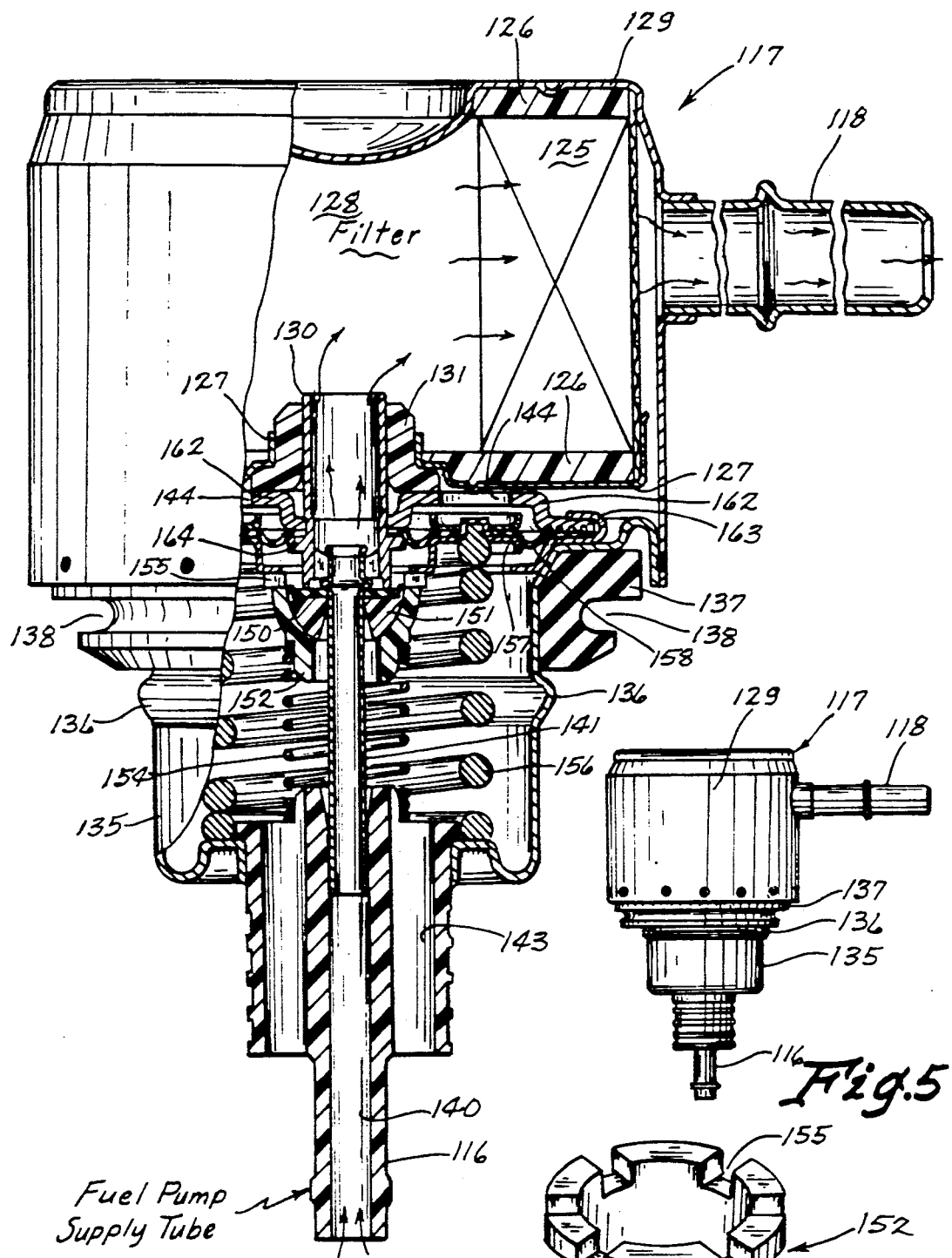

FUEL FILTER AND PRESSURE REGULATOR SYSTEM APPARATUS

TECHNICAL FIELD

The present invention relates to a vehicle fuel supply system and more particularly to a fuel filter and fuel regulator system which regulates the fuel on the dirty side of the filter in response to the pressure on the clean side of the filter whereby only the fuel which is actually delivered to the fuel injectors is filtered.

BACKGROUND ART

In most vehicles having a fuel injection system, such as that shown in U.S. Pat. No. 4,633,901 to Brandt et al, one fuel line leads from a fuel pump in the tank, through a fuel filter to the engine fuel rail and ultimately to the fuel injectors. The amount of fuel is controlled by a pressure regulator disposed adjacent to the fuel rail and consequently is located a relatively long distance from the fuel tank. This requires a fuel return line to return unused fuel to the fuel tank.

One of the problems with the aforementioned prior art is that there is additional expense in having a fuel return line and furthermore if this line is broken for any reason, such as in an accident, the fuel could create a fire hazard.

For this reason and others, returnless fuel filter and regulator systems have been proposed. For example, if the pressure regulator is located in the inlet line from the fuel tank but located adjacent to or attached to the fuel tank. In such a system, then all of the fuel would first pass through a fuel filter before reaching the pressure regulator valve and if more fuel reaches the regulator valve than needs to be delivered to the fuel rail, then the regulator valve will merely dump the excess fuel back into the tank directly.

Still another returnless system proposed uses a pressure transducer at the fuel rail connected to an engine control computer which controls a variable voltage drive for the fuel pump located in the fuel tank. A fuel filter is of course used in the fuel line leading from the fuel pump to the fuel rail at the engine injectors. One of the major problems with this type of system is that it is expensive, for example, especially the pressure transducer, variable voltage drive and the type of fuel pump required for use with this system. Furthermore, if the vehicle is accelerating rapidly such that the drive is moving fast, the inertia of the fuel pump could produce excess fuel if the vehicle needs to stop immediately, for example in an emergency situation, and this could cause flooding of the engine.

In the first two systems referred to above, since all of the fuel which goes to the regulator must be filtered, a larger filter is required than if only the fuel which actually goes to the fuel rail is filtered. In other words, the return line which dumps fuel back into the fuel tank is dumping clean, filtered fuel back into a tank of unfiltered fuel. This will cause more deposits on the filter than would otherwise be necessary and that is the reason why a larger filter is needed than would be needed for the present invention. It is, of course, well known that as a filter becomes clogged with impurities, it will create an increasingly greater pressure drop across the filter. If this pressure drop becomes too great, the required pressure delivered to the fuel rail will be insufficient and the fuel injection system will not operate properly.

Accordingly, there is a need for an improved fuel filter and fuel regulator system which will overcome the aforementioned problems with the prior art.

DISCLOSURE OF THE INVENTION

The present invention relates to a combination fuel pressure regulator and fuel filter apparatus for vehicle fuel systems has a fuel supply tank with a fuel pump therein for pumping fuel to a fuel supply rail having fuel injectors attached thereto. A fuel filter is operably disposed between an inlet supply tube and a fluid outlet tube for filtering impurities from fuel passing therethrough. A valve in fluid communication with the inlet supply tube is provided with a regulator for causing flow to be short circuited back into the fuel supply tank when the pressure in the fluid outlet exceeds a predetermined level. The valve is biased to a closed position and will remain closed when the pressure on the clean side of the filter is below the predetermined pressure whereby all of the fuel in the inlet supply tube will pass through the filter when the pressure in the fluid outlet is below the predetermined pressure.

An object of the present invention is to provide an improved fuel filter and fuel regulator system for vehicles.

A further object of the present invention is to provide a vehicle fuel supply system which is less expensive than prior art systems but which has advantages over such prior art systems.

A still further object of the present invention is to provide a fuel supply system which filters only that fuel which passes onto the fuel supply rail instead of dumping filtered fuel back into the fuel tank during the process of maintaining the desired pressure and flow to the fuel rail as is the practice in prior art systems.

A still further object of the present invention is to minimize the amount of static electricity which inherently is produced during the process of pumping fuel through a fuel regulator.

A still further object of the present invention is to provide a system of the aforementioned type which can be attached directly into or on the fuel tank so that no fuel return line is needed.

Another object of the present invention is to provide a pressure regulator valve which has coaxial flow of the inlet and return fuel.

Another object of the present invention is to provide a fuel regulator valve of the aforementioned type which uses a quiet elastomeric seat as compared to metal-to-metal valves and further provides a mechanism for ensuring that the elastomeric seat is not deformed so much as to cause a permanent set which could affect sealing of the valve.

A still further object is to provide a diaphragm-type pressure regulator which has stops on each side of the diaphragm to prevent damage to the diaphragm if it is exposed to excessive pressure.

Another object of the present invention is to provide a system of the aforementioned-type which does not have a return line to the tank which results in a better failure mode, meaning that any leaks in the diaphragm will leak back into the fuel tank instead of somewhere else which could present a fire hazard.

Other objects, advantages, and novel features of the present invention will become apparent from the following detailed description of the invention when con-

BRIEF DESCRIPTION OF THE DRAWINGS

FIG. 5 is a side elevational view of a combination fuel filter and fuel regulator similar to the one shown in FIGS. 1-4;

FIG. 6 is a partial cross sectional view of the device shown in FIG. 5 in a mode similar to that of the device of FIG. 3 wherein all of the fuel is being pumped through the filter to the fuel rail;

FIG. 7 is a perspective view of one of the elements of the coaxial valve shown in FIG. 6 for allowing fuel to flow therethrough and for selfalignment of the valve seat.

BEST MODES FOR PRACTICING THE PRESENT INVENTION

Figures 1, 2:
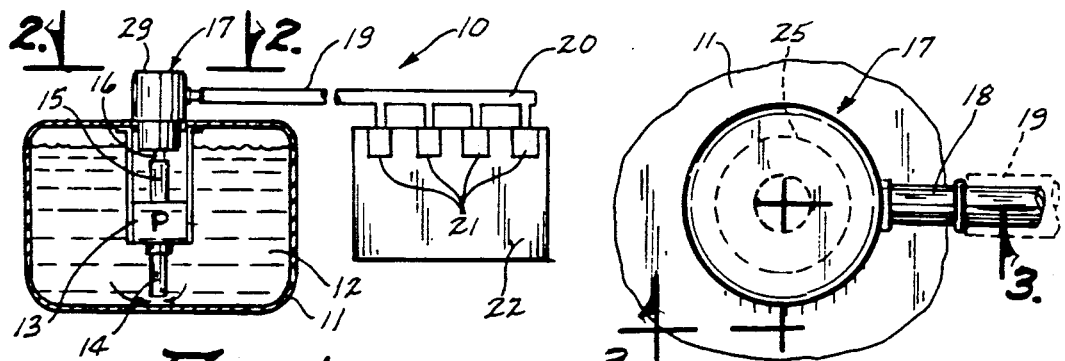
FIG. 1 is a side elevational and partly cross sectional schematic view of a fuel supply system constructed in accordance with the present invention.
FIG. 2 is an enlarged view taken along line 2—2 of FIG. 1 and showing the top of a combination fuel filter and fuel regulator.

Referring now to the drawings wherein like reference numerals designate identical or corresponding parts throughout the several views, FIG. 1 shows a fuel supply system (10) constructed in accordance with the present invention and having a fuel tank (11) with liquid fuel (12) disposed therein. Fuel pump (13) which is preferably electrically operated, constantly draws fuel from an inlet port (14) and delivers it through an outlet port (15) to a fuel pump supply port (16) of a combination fuel filter and fuel regulator (17). An outlet supply tube (18) of the combination filter and pressure regulator (17) is connected to a line (19) leading to a fuel supply rail (20) having a plurality of fuel injectors (21) attached thereto for supplying fuel to an engine (22).

An annular filter (25) which can be constructed of any normal filter material, such as paper, is sealed at the top and bottom thereof by members (26) and (27) to cause all of the fuel which enters the interior chamber (28) of the filter to be forced through filter (25) and not be permitted to go around it. An exterior housing (29) generally defines the filter chamber downstream of the filter (25) which only would contain clean filtered fuel and which has outlet supply tube (18) attached thereto.

A valve tube (30) of rigid material is sealed in place by annual member (31) to prevent it from moving with respect to the filter (25) and housing (29). The closures (27) can have tabs or projections (32) thereon which space the top thereof from the housing (29) and help to hold the filter assembly in place.

The lower portion of the rigid housing (29) consists of housing member (35) which has an annular projection (36) thereon for holding a rubber or elastomeric grommet (37) in place. An annular groove (38) in the grommet (37) receives a circular portion of the top of the fuel tank (11) to hold the unit (17) in the position shown in FIG. 1 without other fasteners or the like.

The fuel pump supply tube (16) is rigidly attached to the bottom of housing portion (35) and a tube (41) is disposed in opening (40) of tube (16) inside of annular O-ring (42), which is held in place by annular washer (43) and the tab (44) on the top of fuel pump supply tube (16).

The top of the tube (41) is supported by an annular member (46) having grooves (47). The member (46) is annular and fits into groove (48) so that it can slide up and down by a slight amount therein, but always keeps the tube (41) centered and coaxial with the valve tube (30).

Figure 3:
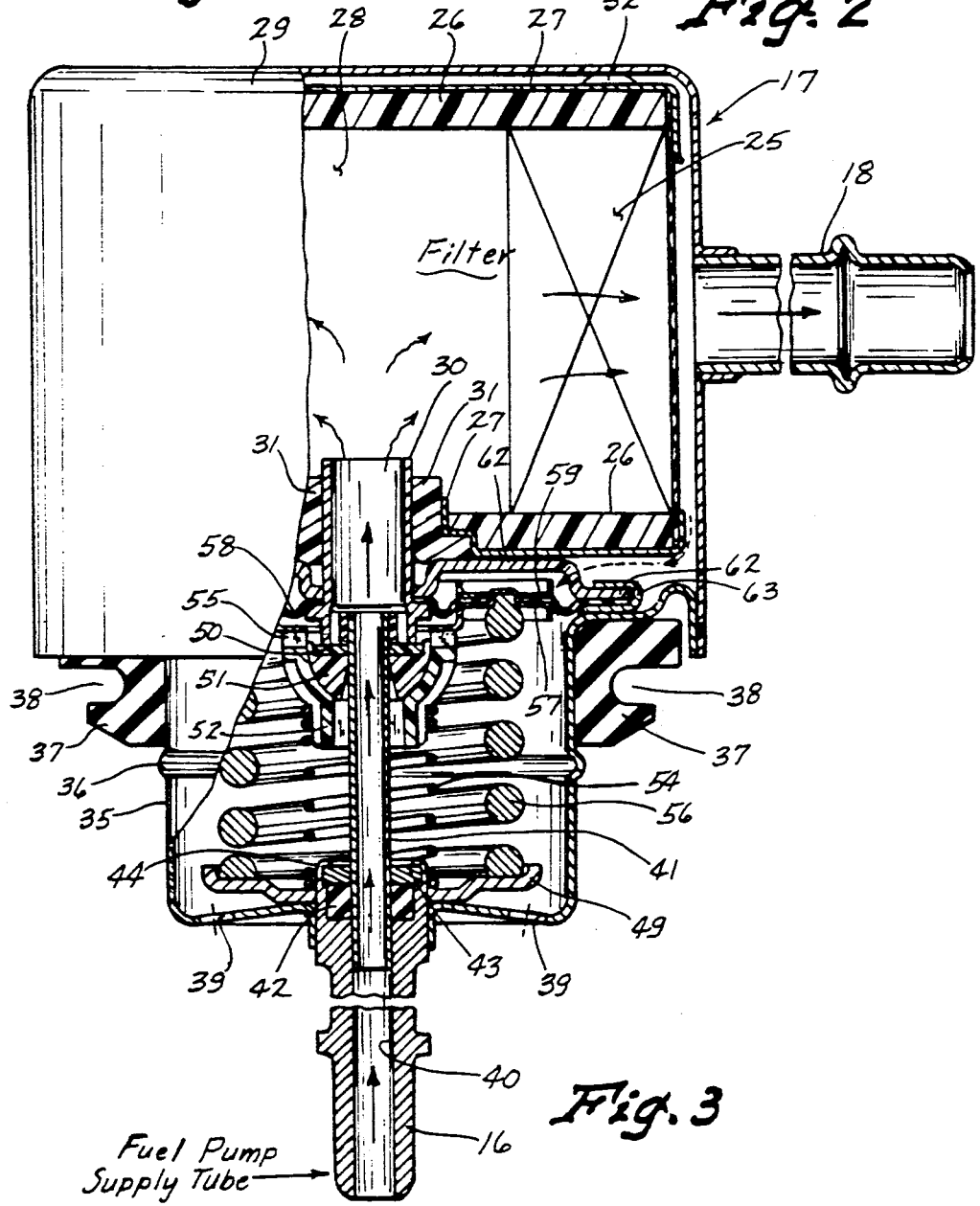
FIG. 3 is an enlarged cross sectional view taken along line 3—3 of FIG. 2 and showing one of the preferred embodiments of the present invention in a mode where the pressure in the outlet of the device is low enough that the coaxial dump valve is closed so that all of the fuel is passing through the fuel filter and is being directed to the fuel supply rail.

An elastomeric valve seat (50) is disposed in the top of a member (51) which has a partially spherical convex outer surface in abutment with a mating concave spherical inner surface on member (52) so that the valve seat (50) can automatically and universally align itself with the valving surface (53) on the bottom of valve tube (30) in the closure mode shown in FIG. 3. A compression spring (54) biases the annular member (52) upwardly, which will, in turn, push the member (51) and annular elastomeric valve seat (50) toward the closed position shown in FIG. 3.

Another spring (56), which is considerably larger and produces a greater force, abuts a member (49) on the bottom thereof, as shown in FIG. 3, and pushes on push member (57) and on annular diaphragm (58) which is disposed between the push member (57) and a backing member (59). A bottom annular portion (61) on push member (57) abuts the top of member (52). The diaphragm (58) is sealingly clamped by members (62) and (63) on the exterior periphery thereof and the annular diaphragm (58) is sealingly clamped between members (62) and flange (64) on tube (30) on the interior of the diaphragm (58).

Figure 4:
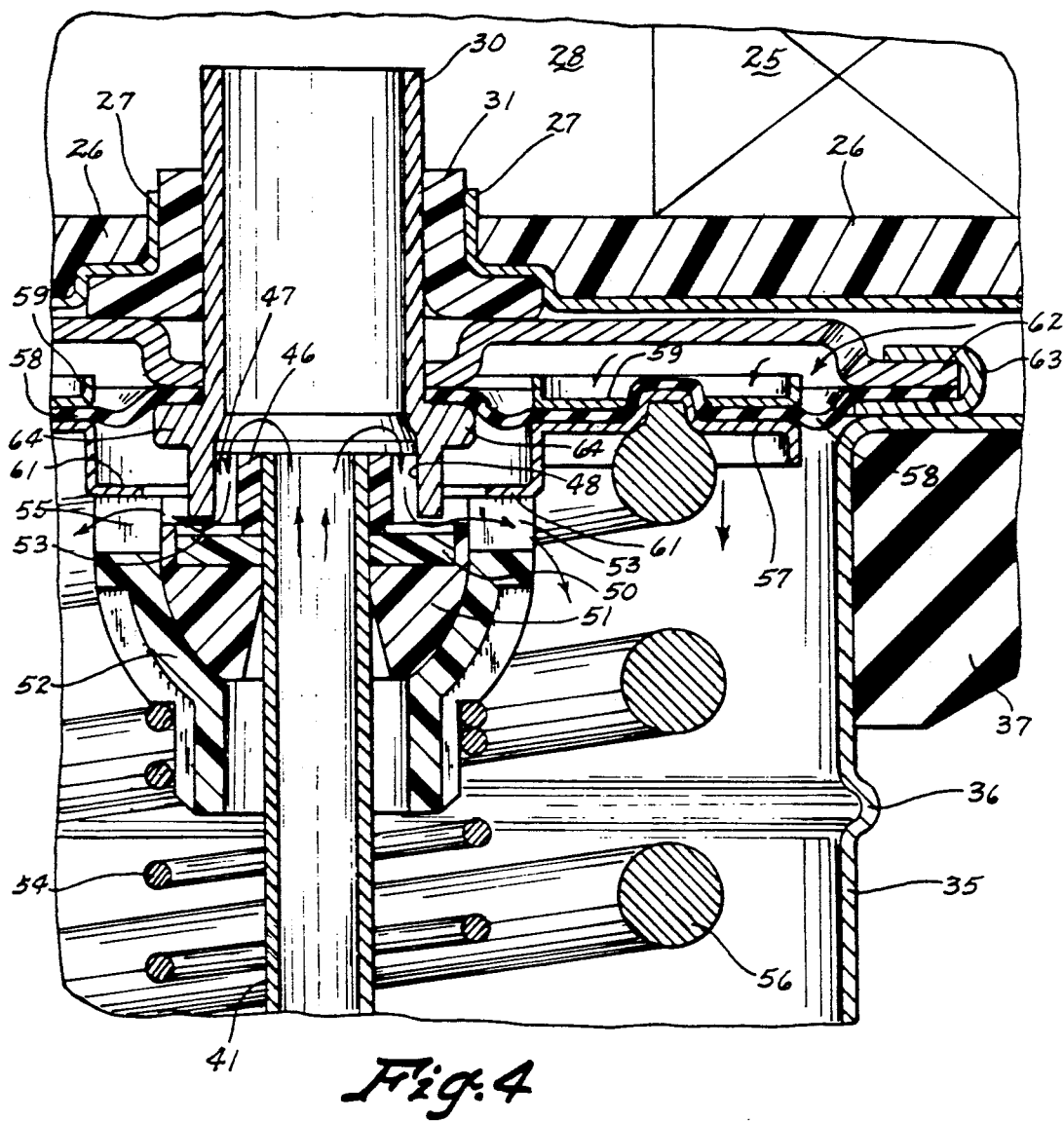
FIG. 4 is an enlarged partial cross sectional view like FIG. 3 but showing what happens when the pressure downstream of the filter exceeds a predetermined pressure, namely that the diaphragm and related structure push the coaxial relief valve open to permit fuel being pumped from the fuel pump toward the filter to be dumped back into the fuel tank.

In operation, the heavy diaphragm biasing spring (56) will push the diaphragm (58) upwardly until it abuts the bottom of bottom member (62) as is shown in FIG. 4. Because this moves flange (61) upwardly, the smaller valve spring (54) will push members (51), (52) and consequently annular valve seat (50) upwardly against the sealing annular surface (53) of the bottom of valve tube (30). This will cause all of the flow from the fuel pump (13) to pass up through the fuel pump supply tube, through tube (40), through valve tube (30), into the interior chamber (28) of the filter (25) and then force this fuel through the filter (25) to be delivered to the fluid outlet (18). Such fuel then is forced on through connection line (19), fuel rail (20) and ultimately is delivered out fuel injectors (21) to the engine (22).

Because of the way these systems are designed, the pressure at the fuel rail must remain constant within certain tolerances. If the pressure increases on the downstream side of the filter (25), for example at fluid outlet (18), which is essentially the same pressure as that chamber inside of housing (29) and outside of the filter (25), this will cause the diaphragm (58) to be pushed downwardly against the upward bias of the spring (56) to the lowered position shown in FIG. 4. As the diaphragm (58) moves downwardly, the flange (61) on annular member (57) will push the member (52) downwardly, overcoming the bias of spring (54) which is pushing the member (52) upwardly. Because of the pressure inside of valve tube (30), the elastomeric seal (50) will move to the position shown in FIG. 4 whereby the flow through tube (41) will flow through opening (47) and between the valve in surface (53) and the seal (50). Flow will continue through slots (55) in member (52) to the lower pressure within the fuel tank (11).

Openings (39) in the bottom of housing portion (35) not only permit this fuel to be returned to the fuel tank (11) but also cause the interior of housing portion (35) to be at the same pressure as the fuel tank (11). The lower portion of the diaphragm (58) is also exposed to the pressure of the interior of the fuel tank (11), which is typically not very much higher than atmospheric pressure and which pressure remains fairly constant. Consequently, the fluid passing through the tube (41) which is returned to the tank through passageways (47) and (55) is not filtered because it is not delivered through filter (25) yet.

As the pressure on the downstream side of the filter (25), for example at fluid outlet (18), decreases due to consumption of fuel at the fuel injectors (21), the diaphragm will tend to rise thereby stopping or lessening the flow through return passageways (47) and (55). This will cause metering of the flow back to the fuel tank (11) as required to maintain the desired pressure of clean fuel at fluid outlet (18).

FIG. 6 shows an alternate embodiment (117) which works essentially like the embodiment (17) shown in FIGS. 3 and 4. A filter (125) is held in place inside housing (129) by members (126), (127) and (131). Valve tube (130) is also clamped in place by member (131). Lower housing portion (135) has grommet (137) held in place by annular flange (136) and has an annular groove (138) for holding it into an opening into the top of the fuel tank (11). A large diaphragm biasing spring (156) biases the diaphragm (158) and corresponding rigid annular members (157) and (159) upwardly as shown in FIGS. 6. Annular members (162) and (163) clamp the outer edges of the diaphragm (158) and the inner edge of the diaphragm is sealingly held between members (162) and flange (164) onto valve tube (130). The top of a tube (141) is held coaxial with the axis of tube (130) by a plurality of radially extending wing members (146) which have spaces between them to allow flow therethrough. Flange (147) and flange (142) prevent the tube (141) from sliding out of contact with the wing members (146). The bottom of the tube (141) extends into an opening (140) of fuel pump supply tube (116).

A diaphragm biasing spring (156) is much larger than a smaller valve seat biasing spring (154). The bottom of the spring (154) is in abutment with the top of member (116) and the biasing spring (154) pushes upwardly on member (152) which has an upper convex spherical surface for matingly receiving the lower partially spherical surface of member (151). An elastomeric valve seat (150) fits in a groove in the top of member (151) and the entire assembly, including valve seat (150), and member (151) and (152) are biased upwardly toward valving surface (153) by the spring (154).

Figure 8:
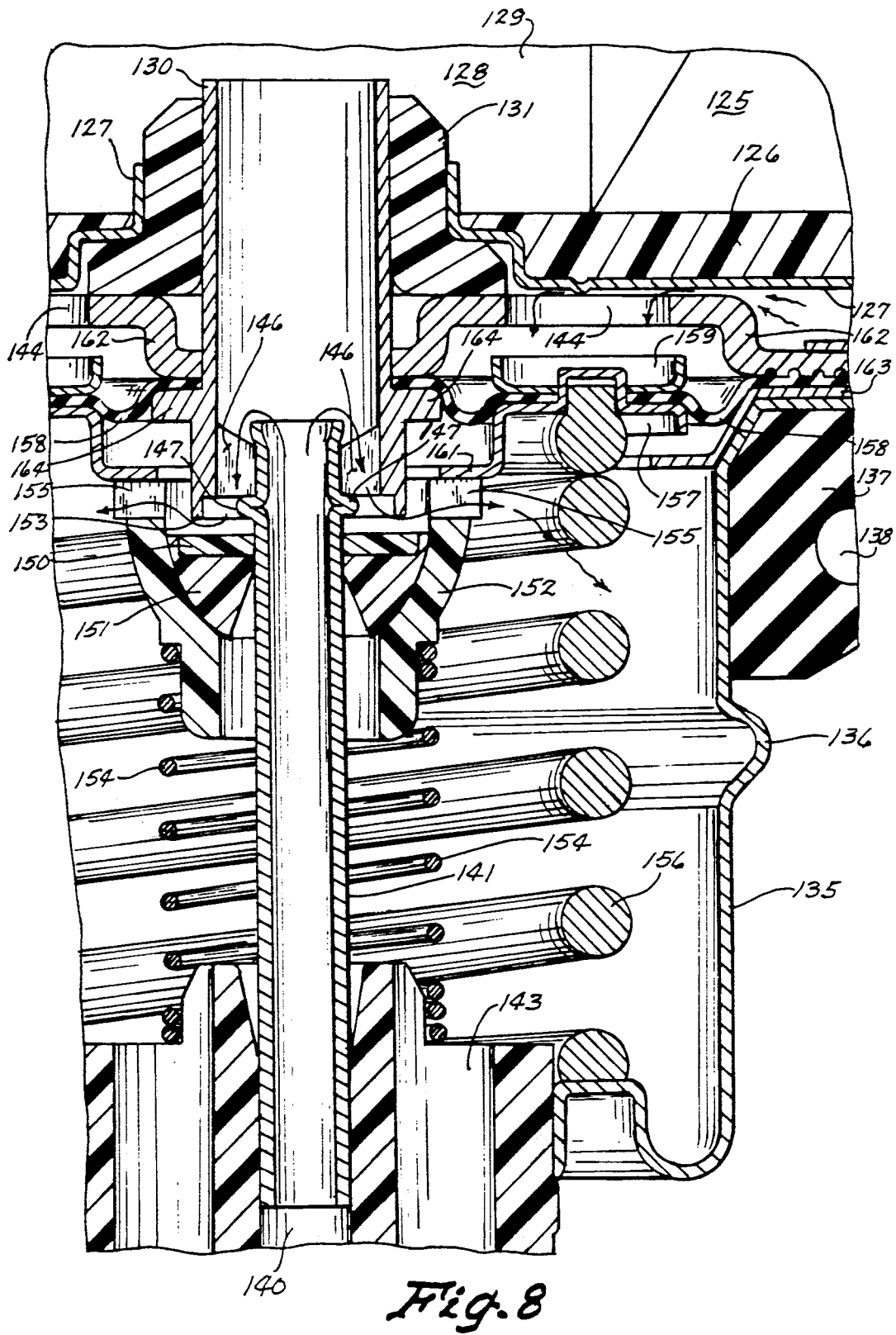
FIG. 8 is a view like FIG. 4 but of the FIG. 6 embodiment which shows that when the pressure on the clean side, or downstream side, of the filter exceeds a predetermined pressure, the coaxial valve is opened to permit some of the fuel being pumped from the fuel pump to the dirty side of the filter to be dumped back into the fuel tank.

The operation of the embodiment (117) shown in FIGS. 5-8 is almost exactly the same as that shown in FIGS. 1-4. Initially the diaphragm biasing spring (156) will push the diaphragm (158) upwardly until member (159) abuts the top of member (162). This will prevent the diaphragm from being damaged if it was not otherwise limited in its upward travel. In the upper position shown in FIG. 6, push member (161) is elevated enough so that the spring (154) can push ultimately the elastomeric valve seat (150) against the annular valving surface (153) of the valve tube (130), thereby causing all of the flow through fuel pump supply tube (116), tube (141) and valve tube (130) to pass into the filter chamber (128) and be forced out through the filter (125) to fluid outlet (118). When the pressure on the clean side of the filter (125), for example at fluid outlet (118) becomes higher than the predetermined pressure desired, the excess pressure will push the diaphragm (158) downwardly as shown by the pressure arrows extending through opening (144) in member (162) in FIG. 8. This will cause annular flange member (162) in FIG. 8. This will cause annular flange (161) to push downwardly on the top of member (152) and cause the spring (154) to compress. This condition, as shown in FIG. 8, allows the pressure of the fuel in tube (130) to force its way past members (146), between valving surface (153) and (150) and be short circuited as shown by the arrows in FIG. 8 back through the lower housing (135) through slots (155) in member (152) and then eventually fall through openings (143) which lead back to the fuel tank (11) shown in FIG. 1.

It will be understood of course that as the pressure on the clean side of the filter (125) fluctuates so will the relative position of the diaphragm (158) and consequently of the distance between the elastomeric seat (150) and valving surface (153) so that metering of the flow returning to the fuel tank occurs. Of course as the pressure on the downstream side of the filter (125) drops, for example because of consumption of fuel by the engine (22), the diaphragm will move upwardly, thereby allowing the valve seat (150) to move upwardly to eventually move to the closed position shown in FIG. 6 whereby all of the flow will go through the filter (125) until such time as conditions change. It is significant to note that the seals (50) and (150) are guided on the interior surface thereof as it moves up and down on tubes (41) and (141) respectively.

Accordingly, it will be appreciated that the present invention does indeed accomplish the aforementioned objects. Obviously many modifications and variations of the present invention are possible in light of the above teachings. It is therefore to be understood that, within the scope of the appended claims, the invention may be practiced otherwise than as specifically described.

We claim:

1. A combination fuel pressure regulator and fuel filter apparatus for vehicle fuel systems comprising:
   a fuel supply tank;
   a housing operably attached to said fuel supply tank;
   an inlet supply tube attached to said housing adapted to be in fluid communication with a fuel pump;
   a fluid outlet attached to said housing adapted to be in fluid communication with a fuel supply rail;
   a fuel filter means disposed within said housing and disposed between said inlet supply tube and said fluid outlet for filtering impurities from substantially all of the fuel passing to said outlet;

valve means in fluid communication with said inlet supply tube for causing flow to be short circuited back into said fuel supply tank when the pressure in said fluid outlet exceeds a predetermined level; and valve biasing means for biasing said valve means closed when said pressure is below said predetermined pressure whereby all of the fuel in said inlet supply tube will pass through said filter when the pressure in said fluid outlet is below said predetermined pressure.

2. The apparatus of claim 1 wherein said valve means comprises:

a valve tube having a central passageway and an annular valving surface on one end thereof; and an annular valve seat which is movable with respect to said valving surface and having a closed position in abutment with said valving surface on said one end of the tube whereby flow will be stopped between the valving surface and the valve seat thereby causing all flow through the inlet supply tube to pass through the filter means and an open position spaced from said valving surface of said tube whereby flow will be permitted between the said valving surface and said valve seat thereby reducing the flow of fuel through said filter means by permitting flow of fuel back to the fuel supply tank.

3. The apparatus of claim 2 including guide conduit means in fluid communication with said inlet supply tube and in fluid communication with said valve tube for guiding the annular valve seat as it moves, while at the same time permitting fuel to flow therethrough.

4. The apparatus of claim 3 including means for holding said guide conduit tube coaxial with said valve tube.

5. The apparatus of claim 3 including alignment means for permitting said valve seat to automatically align itself with respect to said valving surface.

6. The apparatus of claim 5 wherein said alignment means comprises a first member supporting said valve seat and having a partially spherical convex surface thereon and a second member having a mating concave spherical surface thereon for abutment with said partially spherical convex surface.

7. The apparatus of claim 6 wherein said valve biasing means is in abutment with and pushes said second member toward said first member, said first member toward said annular valve seat and said valve seat toward said valving surface of said valve tube.

8. The apparatus of claim 7 wherein said second member has a plurality of slots along the top thereof for permitting fuel flow therethrough when said relief valve means is open.

9. The apparatus of claim 2 wherein said fuel filter means is annular in shape and has a central opening in fluid communication with said valve tube.

10. The apparatus of claim 2 including means for causing the flow of fuel back to the fuel tank to be generally coaxial with the axis of said valve tube.

11. The apparatus of claim 2 wherein said biasing means biases said valve sent toward said valving surface.

12. The apparatus of claim 11 wherein said valve tube is fixed with respect to said housing.

13. The apparatus of claim 12 wherein said annular valve seat is elastomeric.

14. The apparatus of claim 12 including a flexible diaphragm sealingly attached to said housing;

means for causing one side of said flexible diaphragm to be in fluid communication with said fluid outlet and thereby be disposed downstream of said filter means; and means for fluidly communicating the other side of said diaphragm with said fuel supply tank.

15. The apparatus of claim 14 wherein said diaphragm is operatively sealingly attached to said valve tube radially inwardly from where it is sealingly attached to said housing.

16. The apparatus of claim 15 wherein said diaphragm is a flexible member generally annular in shape.

17. The apparatus of claim 14 including a first stop means operatively attached to said housing for preventing said diaphragm from being displaced too far in one direction and a second stop means operatively connected to said housing to prevent said diaphragm from being displaced too far in a direction opposite to said one direction.

18. The apparatus of claim 14 wherein said valve means includes diaphragm biasing means for biasing said diaphragm to a first position corresponding to the closed position of said valve means.

19. The apparatus of claim 18 including pushing means for causing said valve seat to be pushed away from said valving surface to the open position thereof when said diaphragm moves to a second position thereof due to an increase in the pressure at the fluid outlet.

20. The apparatus of claim 19 wherein said valve biasing means includes cushioning means for preventing the force of said diaphragm biasing means to be exerted on said valve seat whereby said valve seat will not be permanently damaged by excessive forces pushing it against said valving surface.

21. The apparatus of claim 20 wherein said cushioning means comprises a spring for urging said seat means toward said valving surface and toward said pushing means.

22. The apparatus of claim 21 wherein said spring is less forceful than said diaphragm biasing means thereby exerting less force on said seat means than said diaphragm biasing means exerts on said diaphragm.

23. Vehicle fuel system comprising:
a fuel supply tank;
a fuel supply rail;
a fuel pump;
a housing operably attached to said fuel supply tank;
an inlet supply tube attached to said housing and being in fluid communication with said fuel pump;
a fluid outlet attached to said housing and being in fluid communication with said fuel supply rail;
a fuel filter means disposed within said housing and disposed between said inlet supply tube and said fluid outlet for filtering impurities from substantially all of the fuel passing to said outlet;
valve means in fluid communication with said inlet supply tube for causing flow to be short circuited back into said fuel supply tank before it passes through said fuel filter means when the pressure in said fluid outlet exceeds a predetermined level; and
valve biasing means for biasing said valve closed when said pressure is below said predetermined pressure whereby all of the fuel in said inlet supply tube will pass through said filter when the pressure in said fluid outlet is below said predetermined pressure.

24. A combination fuel pressure regulator and fuel filter apparatus for vehicle fuel systems comprising:
- a fuel supply tank;
- a fuel supply rail adapted to have fuel injectors attached thereto;
- a fuel pump means having an inlet port and an outlet port for pumping fuel to said fuel supply rail;
- an inlet supply tube in fluid communication with said fuel pump means outlet port;
- a fluid outlet in fluid communication with said fuel supply rail;
- a fuel filter means operatively disposed between said inlet supply tube and said fluid outlet for filtering impurities from substantially all of the fuel passing to said outlet;
- valve means in fluid communication with said inlet supply tube for causing flow to be short circuited back into said fuel supply tank when the pressure in said fluid outlet exceeds a predetermined level; and
- valve biasing means for biasing said valve means closed when said pressure is below said predetermined pressure whereby all of the fuel in said inlet supply tube will pass through said filter when the pressure in said fluid outlet is below said predetermined pressure.

* * * * *